US008295198B2

(12) United States Patent
Newman

(10) Patent No.: US 8,295,198 B2
(45) Date of Patent: Oct. 23, 2012

(54) METHOD FOR CONFIGURING ACLS ON NETWORK DEVICE BASED ON FLOW INFORMATION

(75) Inventor: Greg Newman, Austin, TX (US)

(73) Assignee: Solarwinds Worldwide LLC, Austin, TX (US)

( * ) Notice: Subject to any disclaimer, the term of this patent is extended or adjusted under 35 U.S.C. 154(b) by 164 days.

(21) Appl. No.: 12/000,910

(22) Filed: Dec. 18, 2007

(65) Prior Publication Data

US 2009/0154348 A1 Jun. 18, 2009

(51) Int. Cl.
*G01R 31/08* (2006.01)
(52) U.S. Cl. ........................................ 370/253; 709/223
(58) Field of Classification Search .................. 370/241, 370/253
See application file for complete search history.

(56) References Cited

U.S. PATENT DOCUMENTS

| 7,120,931 | B1 * | 10/2006 | Cheriton ........................ 726/13 |
| 2005/0259654 | A1 | 11/2005 | Faulk, Jr. | |
| 2006/0077964 | A1 * | 4/2006 | Wu et al. ....................... 370/352 |
| 2006/0242694 | A1 * | 10/2006 | Gold et al. ...................... 726/13 |
| 2006/0277184 | A1 | 12/2006 | Faitelson et al. | |
| 2006/0282895 | A1 | 12/2006 | Rentzis et al. | |
| 2007/0016670 | A1 | 1/2007 | Cooper | |
| 2007/0055789 | A1 * | 3/2007 | Claise et al. .................. 709/234 |
| 2007/0192862 | A1 | 8/2007 | Vermeulen et al. | |
| 2007/0201359 | A1 | 8/2007 | Matsubara et al. | |
| 2008/0013532 | A1 * | 1/2008 | Garner et al. ................. 370/389 |

OTHER PUBLICATIONS

Laureano, et al.; "Protecting Host-Based Intrusion Detectors Through Virtual Machines"; Jan. 20, 2007; pp. 1275-1283.
International Search Report, PCT/US2008/013694 dated May 26, 2009.
European Official Communication, European Application No. 08863780.6, mail date May 10, 2011, a total of 4 pages.
European Official Communication, European Application No. 08 863 780.6, dated Sep. 30, 2011.

* cited by examiner

*Primary Examiner* — Mark Rinehart
*Assistant Examiner* — Matthew Hopkins
(74) *Attorney, Agent, or Firm* — Squire Sanders (US) LLP

(57) ABSTRACT

Embodiments of the present invention provide a system and method for using network flows records exported from network routers to provide information about the traffic entering/exiting the device. Network routers or hubs can be configured to authorize or deny various types of network traffic between two network devices whose traffic transits via the router. The method presented describes the creation and application of access control lists on the router from information derived from the network flow information exported by the network router.

17 Claims, 7 Drawing Sheets

Exemplary Flow Record
200

| | |
|---|---|
| Flow Version number | 210 |
| Sequence number | 220 |
| Input and output interface SNMP indices | 230 |
| Timestamps for the flow start and finish time | 240 |
| Number of bytes and packets observed in the flow | 250 |
| Layer 3 headers, including Source & destination IP addresses, Source and destination port numbers, IP protocol, and Type of Service (ToS) value | 260 |
| For TCP flows, the union of all TCP flags observed over the life of the flow. | 270 |

Figure 2

(PRIOR ART)

| Flow Record Number 310 | Source IP Address 320 | Time Stamp 330 | Byte Size 340 |
|---|---|---|---|
| 1 | xxx.xxx.x.1 | $t_1$ | 10 |
| 2 | xxx.xxx.x.1 | $t_2$ | 20 |
| 3 | xxx.xxx.x.2 | $t_3$ | 1000 |
| 4 | xxx.xxx.x.2 | $t_4$ | 2000 |
| 5 | xxx.xxx.x.1 | $t_5$ | 30 |
| 6 | xxx.xxx.x.3 | $t_6$ | 10 |
| 7 | xxx.xxx.x.1 | $t_7$ | 40 |

Exemplary Flow Table 300

Figure 3

| Number of Flow Record Numbers 410 | Source IP Address 420 | Total Byte Size 430 |
|---|---|---|
| 4 | xxx.xxx.x.1 | 100 |
| 2 | xxx.xxx.x.2 | 3000 |
| 1 | xxx.xxx.x.3 | 10 |

Aggregated Flow Table 400

Figure 4

METHOD FOR CONFIGURING ACLS ON NETWORK DEVICE BASED ON FLOW INFORMATION

FIELD OF THE INVENTION

The present invention relates to using network flows data exported from network routers to provide information about the traffic entering/exiting the device. Network routers can be configured to authorize or deny various types of network traffic between two network devices whose traffic transits via the router. The method presented describes the dynamic creation and application of access control lists on the router from information derived from the network flow information exported by the network router.

BACKGROUND OF THE INVENTION

Network usage data is useful for many important business functions, such as subscriber billing, marketing & customer care, product development, network operations management, network and systems capacity planning, and security. Network usage data does not include the actual information exchanged in a communications session between parties, but rather includes numerous usage detail records, known as "flow records" containing one or more types of metadata (i.e., "data about data"). Known network flow records protocols include Netflow®, sFlow®, jFlow®, cFlow® or Netstream®. As used herein, a flow record is defined as a small unit of measure of unidirectional network usage by a stream of IP packets that share common source and destination parameters during a time interval.

The types of metadata included within each flow record vary based on the type of service and network involved and, in some cases, based on the particular network device providing the flow records. In general, a flow record provides detailed usage information about a particular event or communications connection between parties, such as the connection start time and stop time, source (or originator) of the data being transported, the destination or receiver of the data, and the amount of data transferred. A flow record summarizes usage information for very short periods of time (from milliseconds to seconds, occasionally minutes). Depending on the type of service and network involved, a flow record may also include information about the transfer protocol, the type of data transferred, the type of service (ToS) provided, etc. In telephony networks, the flow records that make up the usage information are referred to as call detail records (CDRs).

In network monitoring, the network flow records are collected, stored and analyzed to produce meaningful result. Network usage analysis systems process these flow records and generate reports or summarized data files that support various business functions. Network usage analysis systems provide information about how a network services are being used and by whom. Network usage analysis systems can also be used to identify (or predict) customer satisfaction-related issues, such as those caused by network congestion and network security abuse. In one example, network utilization and performance, as a function of subscriber usage behavior, may be monitored to track a user's experience, to forecast future network capacity, or to identify usage behavior indicative of network abuse, fraud and theft.

In computer security, an access control list (ACL) is a list of permissions attached to an object. More specifically, in networking, ACL refers to a list of rules detailing traffic filtering rules. ACLs can permit or deny traffic through a network device. Only routers and firewalls can have network ACLs. Access control lists can generally be configured to control both inbound and outbound traffic.

ACLs are one way to control network traffic by limiting user and device access to and from undesired addresses and/or ports. ACLs filter network traffic by controlling whether routed packets are forwarded or blocked, typically at a router interface, although other devices can filter packets. The router examines each packet to determine whether to forward or drop the packet, on the basis of the criteria specified within the access lists. An access control list criterion could be the source address of the traffic or the destination address of the traffic, the target port, or protocol, or some combination therein. Typically Internet Protocol (IP) addresses serve as identifiers of the source device on an IP-based network. Access control lists allow differentiated access based on this IP identifier within the network.

While ACLs service useful functions, establishing ACLs may be a laborious. In particular, ACLs are currently programmed manually. Furthermore, the selection of IP addresses to place on the ACLs may be arbitrary and unpredictable.

In particular, many autonomous or enterprise IP networks are large, complex, and dynamic, making them difficult to manage. Network management tasks such as monitoring traffic in a network, analyzing the network's performance, or reconfiguring the network for improved performance require information about the network. However, because large IP networks are highly dynamic, it is difficult to acquire information useful for many network management tasks. Consider that a large IP network may have tens of thousands of nodes and hundreds of routers and gateways. A large corporate network may have 300,000 nodes and 2,500 routers. Routers, gateways, switches, and other network devices sometimes fail, go offline, or return to service. Links often fail, return to service, or degrade in performance. For instance, a microwave or satellite link may experience interference that reduces its bandwidth. Protocols such as OSPF and BGP that are used to route traffic in large IP networks are dynamic and change the routing paths in a large network as conditions change in the network. Even relatively stable networks can take a long time to reach a state of routing convergence. By design, the path of communication between two computers on an IP network can change even during the period of a single connection between them. In view of these factors and others discussed below, it has been difficult for network management tools to obtain information that over time paints a somewhat complete and accurate picture of a network.

Network complexity makes managing networks expensive as it has required manual intervention by skilled human operators. Configuration and management of a large IP network has been difficult to automate. This necessity for close human oversight has led many operators to adopt a conservative policy of preferring network stability over frequent reconfiguration to optimize network performance. Thus, another problem in the field of network management has been that IP networks retain suboptimal network configurations for longer than required, leading to inefficient use of expensive bandwidth capacity and potentially higher communication latencies than otherwise possible. Tools for automated management and configuration have not been widely adopted.

Although tools for network management, including monitoring and maintaining ACLS, do exist, the tools are unsophisticated and have many shortcomings. Most network management tools simply discover and poll live network devices to generate reports containing maps, counter values, averages, areas of high traffic, and so on. Current tools tend to ignore the global dynamics of network behavior, concentrating on centrally unifying potentially conflicting data taken locally from individual network devices. Current tools do not make it easy for an operator to perform a variety of potentially useful tasks such as discovering the path a particular set of traffic takes through the network, investigating the behavior of the network in 'whatif' scenarios, monitoring the evolution of the network as failures and recoveries occur, or analyzing network traffic as it relates to particular applications or services, and so on.

As described above, there have been attempts to measure network traffic at individual user computers, but host traffic data has been limited in scope and generally cannot reveal information related to traffic flow along particular paths in an IP network. Host or end-system network measurement does not provide useful information about network topology. There are also tools that aggregate IP traffic data at network devices such routers and switches, for example, NetFlow® from Cisco Systems. However, these approaches have proven inadequate for numerous reasons such as opaque (e.g., encrypted, tunneled) traffic, complex application communication patterns, sampling artifacts, load on routers introduced by monitoring, and others.

Furthermore, known techniques for identifying viruses are limited. The known techniques generally look for secondary effects of the virus, such as monitoring network resource usage and identifying applications requesting an unnaturally large amount of the network resources. However, it may be difficult to differentiate between the virus and legitimate applications that require a large amount of network resources. Also, virus are becoming more intelligent to avoid detection. For example, a virus may sit dormant on a system for some time, waiting for a signal to initiate. For example, a malicious virus may sit dormant until confidential data is acquired. Thus, while the virus is waiting to act, it would be difficult to detect because it produces minimal side-effects.

SUMMARY OF THE INVENTION

In response to these and other needs, embodiments of the present invention provide a system and method for using network flow records exported from network routers to provide information about the traffic entering/exiting the device. Network routers can be configured to authorize or deny various types of network traffic between two network devices whose traffic transits via the router. The method presented describes the creation and application of access control lists on the router from information derived from the network flow information exported by the network router.

A system provides dynamically controlling a network, the system including: a flow record storage configured to receive flow records from the network and to aggregate the flow records; a data analysis tool configured to receive the aggregate flow records and to analyze the aggregated flow records according to predefined criteria to identify one or more network addresses and ports, and a network device configured to receive the identified network addresses and to add the identified network addresses and ports to an access control list. Optionally, the system further includes access control list storage optionally configured to store the identified network addresses and ports and to provide the identified network addresses to the network device. Optionally, each of the flow records includes a source address and the flow records are aggregated according to the source addresses. Otherwise, the flow records include byte size transmitted in each associated flows, and wherein the predefined criteria includes the total number of bytes transmitted in the associated flow for each of the source addresses. Optionally, a data input device receives input from a user to define the predefined criteria.

Components in the network can be monitored by receiving flow records from the components about traffic on a network. Data defining access control criteria is optionally received, and the flow records are analyzed using the access control criteria. A target and source network addresses or ranges and/or target and source ports that meet the access control criteria and identified and presented to the user. The user may review the identified addresses or ranges, and/or ports then opt to forward these to one of the network components. If sent, component adds the identified network address and/or port to an associated access control list, wherein the access control list prevents traffic from reaching the identified network address and/or port. Optionally, time periods for each access control list can be set to allow for the removal of the automatically entered ACL entries.

In this way, ACL are traffic filtering rules applied in a router or firewall. There are two kinds of ACLs, Standard ACLs that block or allow traffic by Source IP Address only and Extended ACLs that block by Source and Destination IP Address and Source and Destination Port. Accordingly, embodiments of the present application include storing the identified addresses or ports.

In a system for dynamically controlling network traffic, the system includes a flow generating device configured to access a storage system to provide flow records; a flow record storage system configured to receive and store the flow records; and a data analysis device configured to access the storage system and to assess the stored flow records according to predefined criteria. If those flow records satisfy the predefined criteria, that address/port may be forward to a user for review and approval to be added in the ACL. To aid the user, flow record data associated with the identified address/port may be also displayed to the user.

In another embodiment, the techniques disclosed herein describe a method for evaluating address/ports in an ACL. In particular, flow records associated with a address/ports in the ACL may be evaluated according to a predefined criteria. If those flow records satisfy the predefined criteria, that address/port may be forward to a user for review and approval to be renewed in the ACL. Otherwise, if those flow records fail to satisfy the predefined criteria, and address/port may be forward to a user for review and approval to be removed from the ACL.

BRIEF DESCRIPTION OF THE DRAWINGS

The above and other objects, features and advantages of certain exemplary embodiments of the present invention will be more apparent from the following detailed description taken in conjunction with the accompanying drawings in which:

FIG. 2 (prior art) depicts a known exemplary flow record;

FIG. 3 depicts a known exemplary table for storing the flow records in accordance with embodiments of the present invention;

FIG. 4 depicts an exemplary table for storing aggregated flow records in accordance with embodiments of the present invention;

DETAILED DESCRIPTION OF THE PREFERRED EMBODIMENTS

Figure 1A:
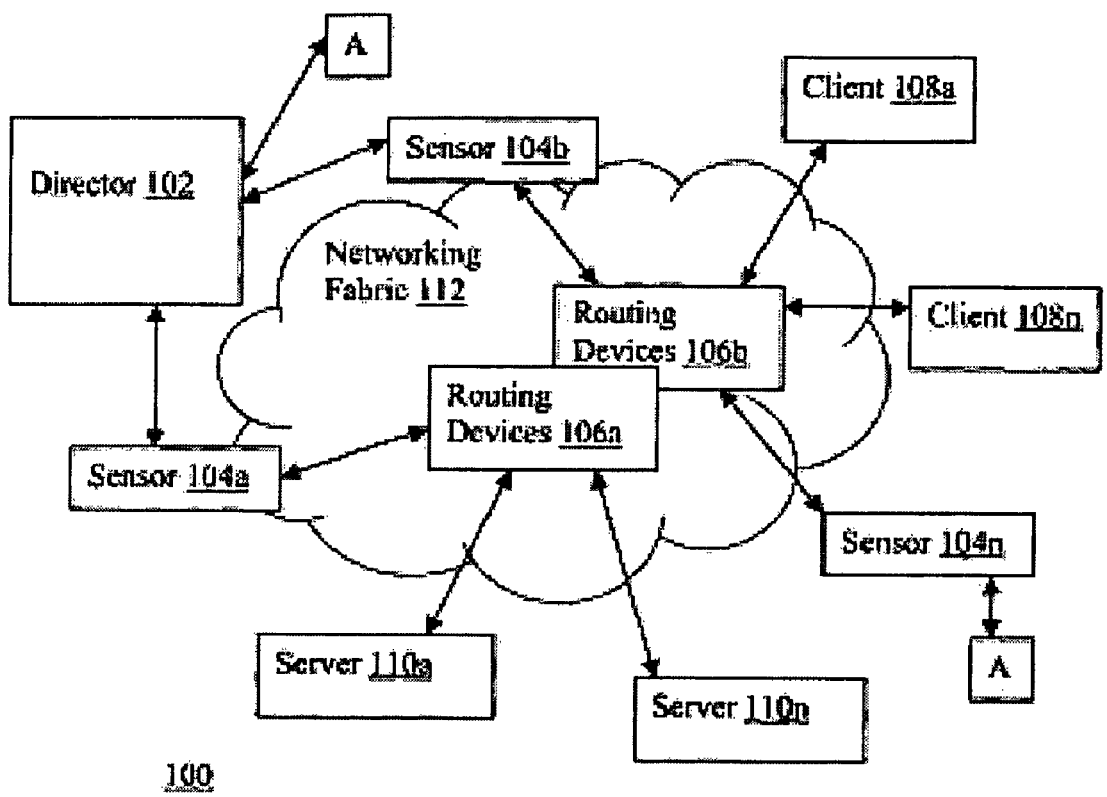
FIG. 1A depicts an exemplary network in accordance with embodiments of the present invention network.

A network 100 in accordance with embodiments of the present invention is depicted in FIG. 1A, wherein a block diagram illustrating a network view of the present invention, in accordance with one embodiment, is shown. As illustrated, client devices 108a-108n are coupled to servers 110a-110n through networking fabric 112, which includes a number of routing devices 106a-106n coupled to each other forming a plurality of network links. Client devices 108a-108n, via routing devices 106a-106n, or more specifically, over the network links formed by routing devices 106a-106n, selectively access servers 110a-110n for services. Unfortunately, as those skilled in the art would appreciate, the same network links that make servers 110a-110n readily accessible to client devices 108a-108n also render them vulnerable to abuse or misuse by one or more of client devices 108a-108n. For example, one or more client devices 108a-108n may individually or in combination launch an attack, such as a denial of service attack, or otherwise victimize one or more servers 110a-110n, routing devices 106a-106b and/or the links interconnected the elements. In accordance with the present invention, director 102, complemented by a number of sensors 104a-104n, are employed to detect and prevent such abuse or misuse of the network links, to be described more fully below. For the illustrated embodiment, sensors 104a-104n are disposed in distributed locations. In alternate embodiments, some or all of sensors 104a-104n may be integrally disposed with routing devices 106a-106b.

Network 112 represents a broad range of private as well as public networks or interconnected networks, such as an enterprise network of a multi-national corporation, or the Internet. Networking nodes, such as clients 108a-108n and server 110a-110n represent a broad range of these elements known in the art, including individual user machines, e-commerce sites, and the like. As alluded to earlier, routing devices 106a-106n represent a broad range of network trafficking equipment, including but are not limited to conventional routers, switches, gateways, hubs and the like.

While for ease of understanding, only one director 102, and a handful each of network nodes, clients 108a-108n and servers 110a-110n, routing devices 106a-106n and sensors 104a-104n are included in the illustration, from the description to follow, those skilled in the art will appreciate that the present invention may be practiced with more than one director 102 as well as more or less network nodes, routing devices 106a-106n and sensors 104a-104n. In particular, the present invention may also be practiced with one or more directors 102. When more than one director 102 is employed, each director 102 may be assigned responsibility for a subset of sensors 104a-104n, and the directors 102 may relate to each other in a master/slave relationship, with one of the directors 102 serving as the "master" (and the others as "slave"), or as peers to one another or organized into an hierarchy, to collective discharge the responsibilities described below.

The operation of the director 102 is described in greater detail below, and the director 102 includes a flow data connection system and an access control device, as described in greater detail below.

Figure 1B:
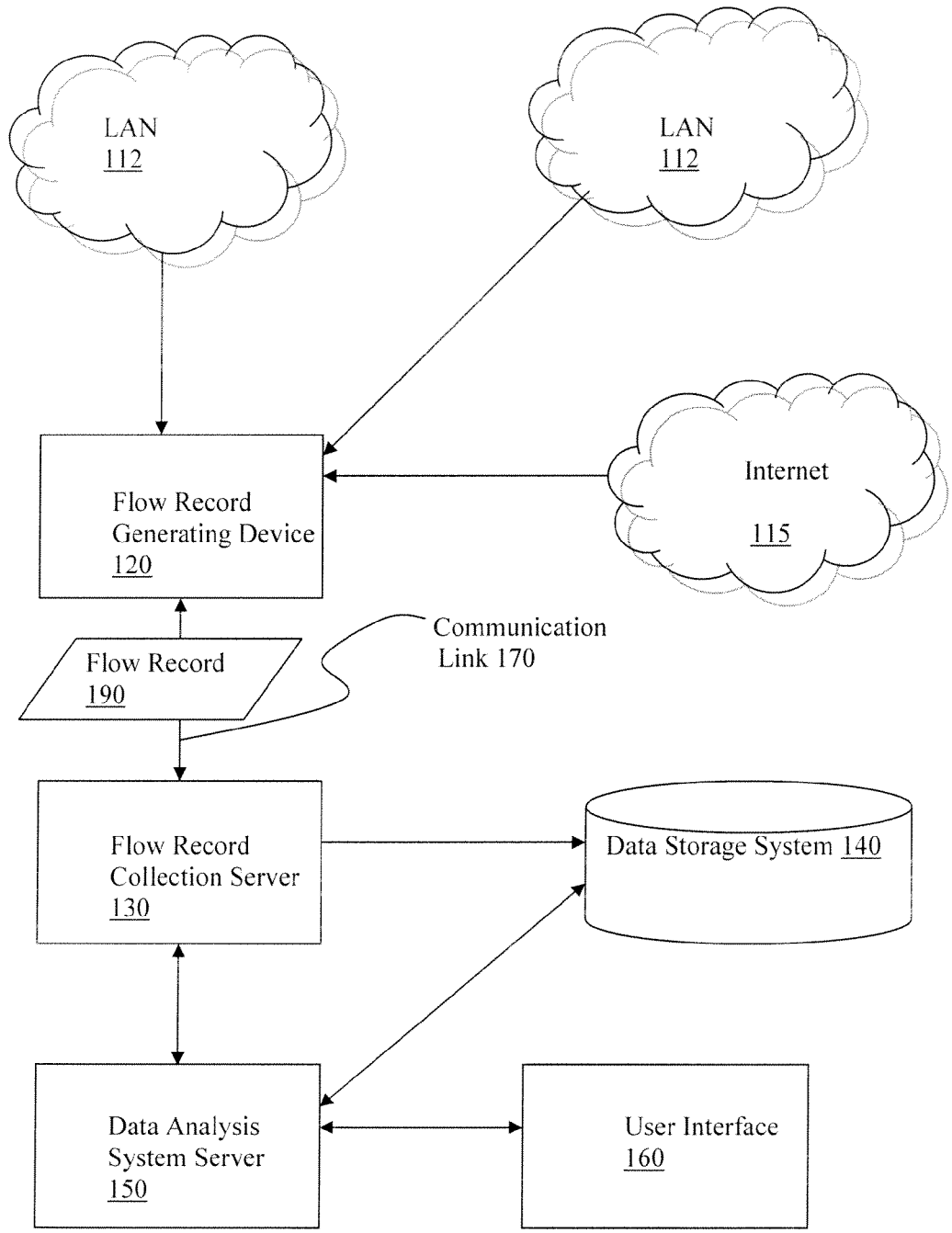
FIG. 1B (prior art) depicts a known flow records analysis system.

As shown in FIG. 1B, a known network usage analysis system 111 includes a data collection system server 130 and a data storage system 140, in one embodiment. The data collection system server 130, also called a listener, is a central server that collects the flow datagrams 190 from all various network agents 120 to storage and analysis. The data collection system server 130 receives flow records 190 from the flow record generating device 120, which is a network device that is part of an IP network 114. In one embodiment, network 114 includes the Internet 115.

In general, flow record generating devices 120 may include substantially any network device capable of handling raw network traffic at "line speeds" and generating flow records from that traffic. Exemplary flow record generating devices 120 include routers, switches and gateways, and in some cases, may include application servers, systems, and network probes. In most cases, the small flow record records generated by flow record generating devices 120 are exported as a stream of flow records 190 to the data collection system server 130.

Various network protocol run on network equipment for collecting network and internet protocol traffic information. Typically, various network agents 120, such as routers, have flow feature enabled to generate flow records. The flow records 190 are typically exported from the network agent 120 in User Datagram Protocol (UDP) or Stream Control Transmission Protocol (SCTP) packets and collected using a flow collector. For more information, please refer to Internet Engineering Task Force (IETF) standard for Internet Protocol Flow Information eXport (IPFIX) at http://www.ietf.org/html.charters/ipfix-charter.html.

As described above, flow records 190 are usually sent by the network agents 120 via a UDP or SCTP, and for efficiency reasons, the network agents 120 does not store flow records once they are exported. With a UDP flow, if the flow record 190 is dropped due to network congestion, between the network agent 120 and the data collection server 130, it may be lost forever because there is no way for the network agent 120 to resend the flow record 190. Flow may also be enabled on a per-interface basis to avoid unnecessarily burdening of the router's processor. Thus, the flows records 190 are generally based on the packets input to interfaces where it is enabled to avoid double counting and to save work for the network agent 120. Also, the network agent 120 may export a flow records for dropped packets.

Network flows have been defined in many ways. In one implementation, a flow includes a 5-tuple: a unidirectional sequence of packets to define Source IP address, Destination IP address, Source TCP port, Destination TCP port, and IP protocol. Typically, the network agent 120 will output a flow record when it determines that the flow is finished. The network agent 120 does this by "flow aging," where the network agent 120 resets an aging counter when the network agent 120 sees new traffic for an existing flow. Also, TCP session termination in a TCP flow causes the network agent 120 to expire the flow. The network agent 120 can also be configured to output a flow record at a fixed interval even if the flow is still ongoing. Alternatively, an administrator could define flow properties on the network agent 120.

A flow record 190 can contain a wide variety of information about the traffic in a given flow. An exemplary flow record 200 contains the following values, as defined in FIG. 2. In particular, typical flow records 200 may include a version number 210 to identify the type of flow being used. A Sequence number 220 identifies the flow record.

Continuing with FIG. 2, input and output interface simple network management protocol (SNMP) indices 230 may be used to dynamically identify network devices through SNMP. SNMP is used by network management systems to monitor network-attached devices for conditions that warrant administrative attention, and consists of a set of standards for network management, including an Application Layer protocol, a database schema, and a set of data objects. SNMP exposes management data in the form of variables on the managed systems, which describe the system configuration. These variables can then be queried (and sometimes set) by managing applications. Modular devices may renumber their SNMP indexes whenever slotted hardware is added or removed. Index values are typically assigned at boot time and remain fixed until the next reboot.

Continuing with FIG. 2, each of the flow records 200 further typically include information on the data transmission, including a time stamps of start and finish times 240. Other information on the data transmission includes information on the number of bytes and/or packets in a flow 250. The conditionals of the data transfer may also be included in the flow record 200, such as header data 260 describing the source and destination addresses, the source and destination addresses port numbers, transmission protocol, and the type of service (ToS). For Transmission Control Protocol (TCP), the flow record 200 may further indicate the union of all TCP flags during the flow. As well known from TCP, a data transmission involves a series of communications confirm, for example, by pairs of acknowledgements flags (ACKs). An imbalance of TCP flags suggests a message failure, whereby a message was sent and never received.

The lack of reliability in the UDP transport mechanism does not significantly affect the accuracy of the measurements obtained from a sampled flow. For example, if flow samples are lost, then new values will be sent when the next polling interval has passed. In this way, the loss of packet flow samples is a slight reduction in the effective sampling rate. When sampling is used, the UDP payload contains the sampled flow datagram. Thus, instead of including an entire flow record 190 each datagram instead provides information such as the flow version, its originating agent's IP address, a sequence number, how many samples it contains and the flow samples.

Continuing with FIG. 1B, the data collection system server 130 receives the streaming flow records 190 from flow record generating device 120 via a communication link 170. In one embodiment, the flow record generating device 120 may be included within network 114. In another embodiment, the flow record generating device 120 may be implemented at a location physically apart from, though functionally coupled to, network 114. Though shown in FIG. 1 as separate from the data collection system server 130, flow record generating device 120 may be a part of data analysis system server 130, in another embodiment.

A data analysis system server 150 accesses and uses the flow records 190 to perform predetermined network usage statistical analysis. In general, the data analysis system server 150 implements various statistical model that are defined to solve one or more network usage related problems, such as network congestion, network security abuse, fraud and theft, among others. The data analysis system server 150 uses the flow records 190 and the statistical models to generate a statistical result, which also may be subsequently stored within a data storage system 140. Exemplary embodiments for storing the statistical result will be described in more detail below. By analyzing flow data, the data analysis system server 150 can build a picture of traffic flow and traffic volume in a network. Applicant of the data analysis system 150 is described in greater detail below.

In one aspect, the data analysis system server 150 may be responsive to a user interface 160 for interactive analysis of the flow records 190. User interface 160 may comprise substantially any input/output device known in the art, such as a keyboard, a mouse, a touch pad, a display screen, etc. In one example, a graphical display of the statistical results may be output to a display screen at user interface 160.

In one embodiment, data analysis system server 150 comprises a computer software program, which is executable on one or more computers or servers for analyzing the network usage data in accordance with various embodiments of the invention. Although the data storage system 140 is shown as external to the data collection system server 130 and/or the data analysis system server 150, the data storage system 140 could be alternatively arranged within either of the servers 130 and 150. Data storage system 140 may comprise substantially any volatile memory (e.g., RAM) and/or non-volatile memory (e.g., a hard disk drive or other persistent storage device) known in the art.

Referring now to FIG. 3, an exemplary table 300 for storing multiple flow records 200 in a storage device 140 is presented. In particular, the depicted table 300 includes a column that assigns a flow record identifier 310 for each of the n received flow records 200. The table 300 also includes a column that contains an IP source address 320 for each of the received flow records 200, a column that contains a time stamp 330 for each of the received flow records 200, and a column that contains a byte size 340 in the flows associated with the received flow records 200.

In the example of FIG. 3, the exemplary flow table 300 includes seven flow records describing seven flows, as indicated by the flow record identifier 310. In this particular example, the seven flows originated at 3 unique source addresses 320. For example, flow records 1, 2, 4, and 7 all originated from the same sources. Although not depicted, the exemplary flow table 300 could similarly include other aspects of the flow record 200, as described above in FIG. 2, such as a destination location, QoS, transmission protocol, etc. Continuing with exemplary flow table 300 in FIG. 3, a time stamp value 330 indicates a time associated with each of the flows and bytes size value 340 to indicate the size of each of the flows associated with the listed flow records 1-7 Identified in column 310.

Referring now to FIG. 4, the data in the exemplary flow data table 300 is aggregated in aggregated flow table 400 according to the source IP address 420. Typically, the aggregation is done over one or more predefined time periods. For example, the exemplary aggregated flow table 400 includes a column that with the aggregated number of flow records 410 associated with each of the source IP addresses 420 in the table 300. The aggregated flow table 400 further indicates the total byte size of the flows for each of the source IP addresses 420 in the table 300. Applications of the Aggregated flow table 400 are described below. As with the flow record table 300, it should be appreciated that flow records 190 may be aggregated as desired, for example according to one or more of the flow records categories described in the exemplary flow record 200 in FIG. 2.

Figure 7:
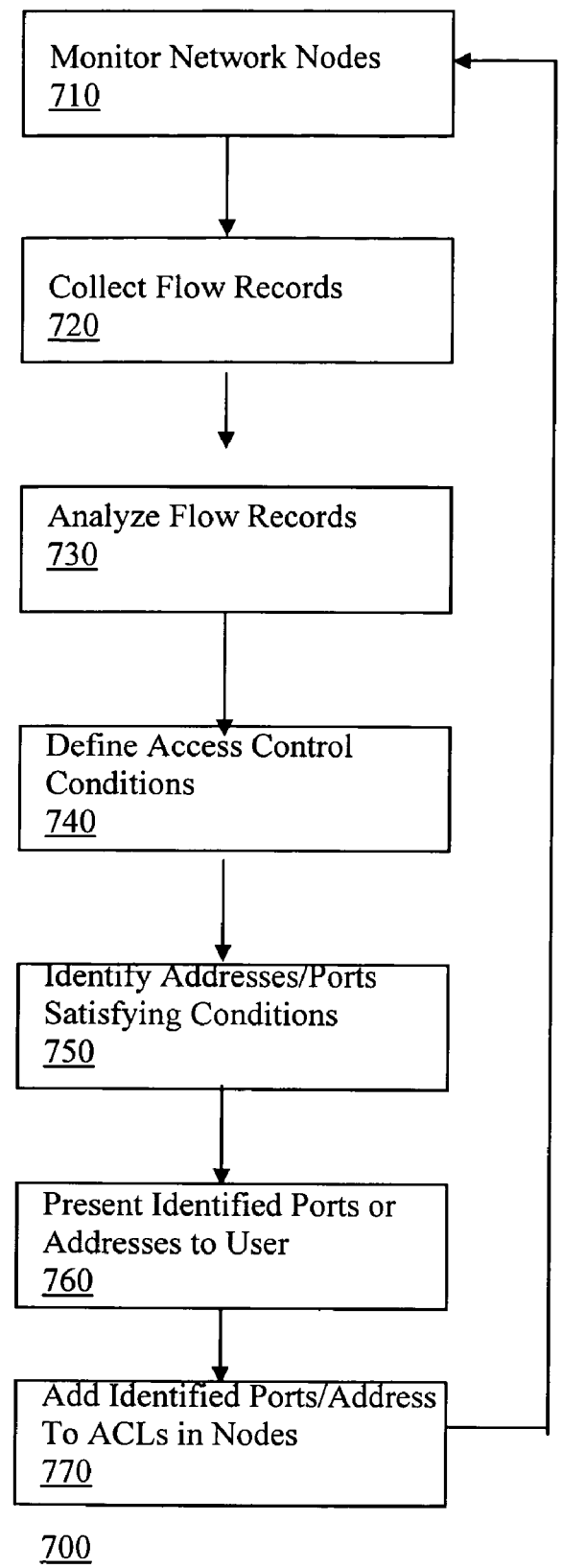
FIG. 7 is a flow diagram depicting the steps in a method for creating ACLs using flow records in accordance with embodiments of the present invention.

Referring now the FIG. 7, an access control method 700 in accordance with embodiments of the present invention is now disclosed. In step 710, traffic in the network components are monitors according to known techniques, as described above, and flow records are collected in step 720. Typically, steps 710 and 720 may be performed using functionalities already included in most network components, such as routers, hubs, servers, etc and may be used to collect and store a flow record, such as exemplary flow record table 300. The collected flow records from step 720 are analyzed in step 730. For example, the flow records may be aggregated, such as forming an aggregated flow record table 400 described above.

Continuing with the access control method 700, access control conditions are defined in step 740. Default predefined access control conditions may be used to assess the flow records. For example, address or ports associated with a certain percentage or amount of traffic may be identified. For example, access may be limited for the source IP addresses 420 based upon the most number of transactions 410, times of the 330, or the largest amount of transferred data 430. These criteria can be objective such as establishing a maximum threshold for certain criteria, or subjective based upon a rankings of the criteria by of the source or target IP address and or port with the largest or most frequent consumers of network resources (or other criteria). Optionally, the criteria can be provide by a user.

The source or target IP address and or port meeting these criteria can be identified in step 750 using simple logic. In step 760, the identified source or target IP address and or port identifiers can be presented to a user. These source IP addresses (or other device identifiers) for the identified network devices can be then placed on an ACL in step 770 to request network devices to ignore or otherwise refuse to transmit traffic associated with identified ports/addresses, if approved by a user.

Figure 5:
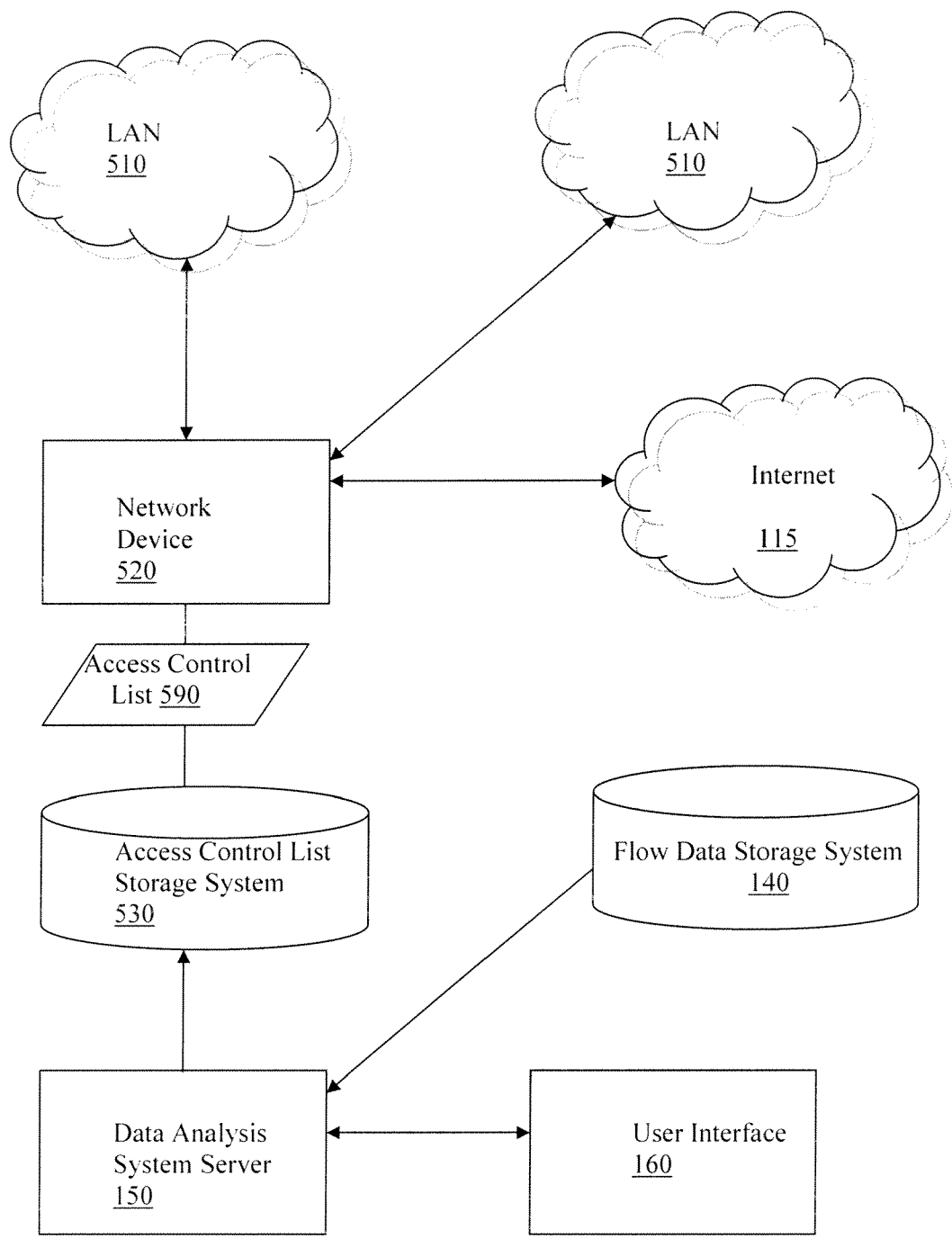
FIG. 5 depicts a system for creating ACLs using the flow data in accordance with embodiments of the present invention.

Referring now to FIG. 5, an access control system 500 in accordance with embodiments of the present invention is now disclosed. As described above, a flow data storage system 140 may receive the raw flow records 190. The flow data storage system 140 may aggregate the flow records 190, as described above, in various known ways to accomplish system goals or the flow records may be stored in a raw form. The flow records may be accessed and assessed by the data analysis tool 150 according to criteria received and/or defined via the user interface 160 to define network addresses/ports to be added to ACLs. Likewise, it should be appreciated that ports/addresses that do not meet the predefined criteria over period of time may also be automatically identified and suggested to the user for removal from the ACLs. Typically, any address in the flow records or addresses in the ACL identified dynamically according to the predefined criteria is forwarded to the user interface to be reviewed by an administrator. The administrator may then approve the addition/removal of the identified port/address from the ACL.

The ACLs 590 on a network device 520 or, optionally, may be stored in an ACL storage system 530 and forwarded to any network device 520 that receives traffic via LANs 510 or the Internet 115. The network device 520 typically refuses to forward any traffic associated with an identified device in the ACL in either the device 520 or the optional ACL storage 530. That is, traffic destined to and/or originating from an address in the ACL arrives at the device 520 and is not forwarded through the networks 510, 115. When the traffic communications times out, the communication is removed from storage and never reaches an indicated destination.

Figure 6:
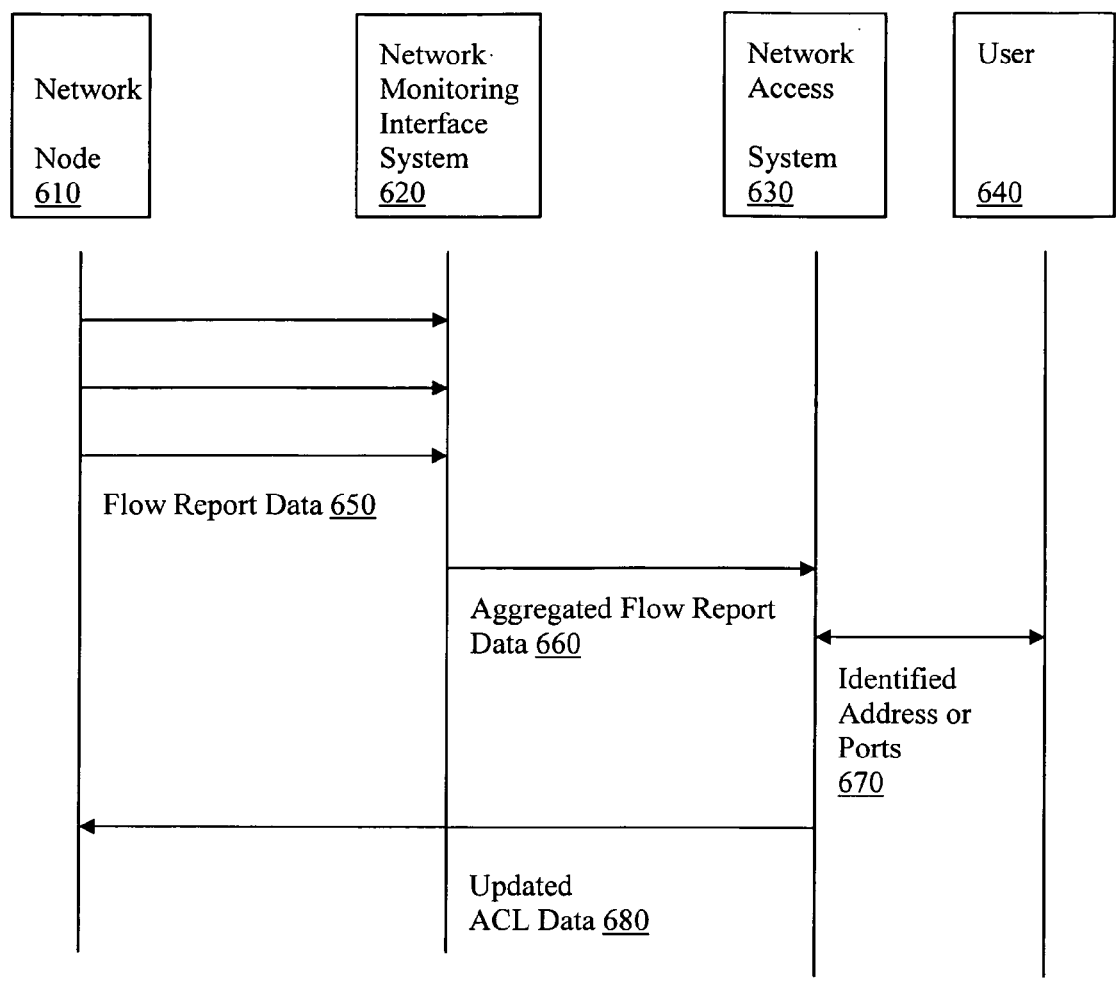
FIG. 6 is a service flow diagram that explains the communications between a network node, an access control system, and a flow record storage system in accordance with embodiments of the present invention.

Referring now to the service flow diagram 600 in FIG. 6, a network node 610 may forward flow reports 650 describing network traffic to a network monitoring system 620. As described above, the network monitoring system 620 may collect and store the flow records 650. Stored flow records 660 may be accessed by an access control system 630 that evaluates the stored flow records 660 according to predefined criteria to automatically identify network addresses/ports. The identified addressed are forward to a user interface 640 to be reviewed. If the identified address/port is accepted by the user, the address/port may be sent to the network node 610 as ACL update data 680 for implementation of the ACL.

While the invention has been described with reference to an exemplary embodiments various additions, deletions, substitutions, or other modifications may be made without departing from the spirit or scope of the invention. Accordingly, the invention is not to be considered as limited by the foregoing description, but is only limited by the scope of the appended claims.

What is claimed:

1. A system for dynamically controlling network communications, the system comprising:
    a network device configured to receive network traffic and to produce a plurality of flow records describing said network traffic;
    a flow record storage configured to receive said flow records from said network device and to store said flow records; and
    a data analysis tool configured to access the flow record storage to retrieve said stored flow records and to assess each of said flow records according to predefined criteria to dynamically identify an address, wherein the data analysis tool is further configured to implement statistical models configured to solve network usage related problems, and wherein the data analysis tool uses the flow records and statistical models to generate a statistical result that is then stored in the flow record storage;
    wherein each of said plurality of flow records comprises a sequence number identifying the flow record, a source node address, a destination node address, a source port address, a destination port address, and number of bytes or packets transmitted in each associated flow, and
    wherein the predefined criteria comprises the total number of bytes transmitted in the associated flow for each of the node or port addresses,
    wherein the network device is configured to receive said identified address and to add said identified address to an access control list to prevent forwarding traffic associated with said identified address; and
    an input/output device configured to display to a user said identified address received from the data analysis tool, and wherein the data analysis tool is configured to forward the identified address to the network device to be added to the access control list only if the user provides an input to accept the identified address.

2. The system of claim 1 further comprising an access control list storage configured to store said identified address and to provide said identified address to the network device.

3. The system of claim 1, wherein said flow records are aggregated according to said node and/or port addresses.

4. The system of claim 1, wherein the input/out device further acquires and displays flow records data associated with said identified address.

5. A method for managing a network comprising:
    monitoring traffic through components in the network;
    receiving flow records from said components describing said traffic;
    analyzing the flow records and identifying an address that meets a predefined criterion, wherein the predefined criterion comprises a maximum total number of bytes associated with an address;
    displaying to a user said identified address; and
    after the user approves the identified address, forwarding the identified address to one of the network components, wherein said component adds the identified address to an associated access control list, wherein said access control list directs the component to prevent forwarding traffic associated with said identified address.

6. The method of claim 5, wherein said identified address is automatically removed from the access control list after a predefined time period.

7. The method of claim 5, wherein said address identifies at least one of a source node, a destination node, a source port, and a destination port.

8. The method of claim 7, wherein said address identifies a source node.

9. The method of claim 5, further comprising displaying to the user flow records data associated with said identified address.

10. A system for dynamically controlling traffic in a network, the system comprising:
- a flow record generating device configured to provide flow records describing said network traffic;
- a flow record storage system configured to receive and store the flow records;
- a data analysis device configured to access the storage system and to assess the stored flow records according to predefined criteria;
- wherein the data analysis device is configured to dynamically identify at least one address satisfying said predefined criteria, said at least one address comprising a port or a node address associated with the traffic, and
- wherein the identified at least one address is added to an access control list and components in the network will not forward traffic associated with addresses in the access control list,
- wherein each of said flow records comprises a time stamp, and wherein the predefined criteria comprises a time window.

11. The system of claim 10, wherein the flow data storage system is configured to aggregate the flow records.

12. The system of claim 10, further comprising a user interface configured to display to a user said identified address, and whereby the identified address is added to the access control list only after the user accepts the identified address.

13. The system of claim 12, wherein the user interface is further configured to display to the user flow records data associated with said identified address.

14. A method for evaluating an address on an access control list, the method comprising:
- monitoring traffic through components in the network;
- receiving flow records from said components describing said traffic;
- analyzing any of said received flow records associated with said address in the access control list according to a predefined criterion;
- renewing the address in the access control list if said address satisfies said predefined criterion; and
- displaying to a user said address, and wherein the renewing of the address occurs after the user approves the address.

15. The method of claim 14, further comprising displaying to the user flow records data associated with said address.

16. The method of claim 14, wherein said address identifies at least one of a source node, a destination node, a source port, and a destination port.

17. The method of claim 14, wherein said address is automatically removed from the access control list after a predefined time period.

* * * * *